June 25, 1946.  C. W. MADSEN  2,402,565
SHAFT OILER
Filed Jan. 21, 1942
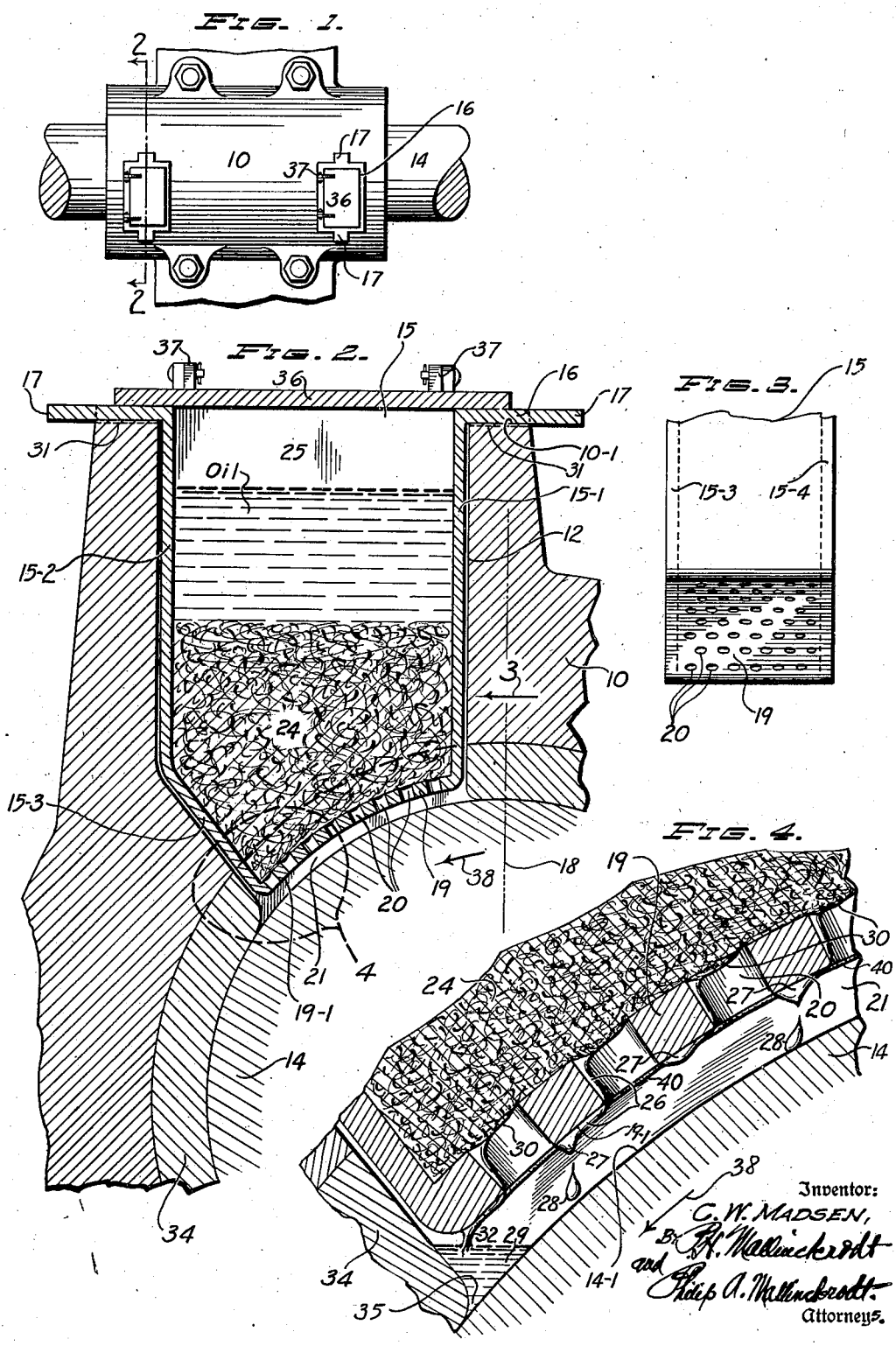
Inventor:
C. W. MADSEN,
By
Attorneys.

Patented June 25, 1946

2,402,565

UNITED STATES PATENT OFFICE 2,402,565

SHAFT OILER

Carl W. Madsen, Magna, Utah; Dora H. Madsen, administratrix of said Carl W. Madsen, deceased, assignor, by decree of distribution, to Dora H. Madsen, Midvale, Utah Application January 21, 1942, Serial No. 427,579

8 Claims. (Cl. 308—125)

This invention relates to a lubricating device for journal bearings and more particularly for bearings of the so-called waste-packed type that are extensively used with shafts of heavy machinery such as modern crushing rolls. However, the use of the invention is not necessarily restricted to bearings of large size.

Among the principal objects of the invention are the following:

*First.*—To provide an overhead feed of lubricant rather than one which draws lubricant from underneath a shaft.

*Second.*—To provide a practical and efficient means of supplying oil or other lubricant to a rotating shaft so that the amount of oil or lubricant is always ample but not wasteful.

*Third.*—To eliminate troubles that are prevalent in substantially all bearings of the waste-packed or wick-packed types as heretofore constructed.

*Fourth.*—To eliminate the possibility of damage to the packing material caused by hardening or burning in consequence of running contact with a shaft; thus the packing material is rendered fit for continuous use or for re-use.

*Fifth.*—To economize oil, because the oil is not rapidly siphoned off.

*Sixth.*—To prevent the cutting or scoring of a shaft, because all dust and dirt that is caught by the packing is prevented from touching the shaft, since the packing material is always out of direct contact with the shaft surface.

Other objects too, will become apparent after the invention is more fully understood.

In bearings of the waste-packed type, a relatively large mass of waste is tightly compacted in a confined cavity and serves as an absorbent reservoir from which oil feeds into the bearing.

It is well known to users of heavy machinery in which waste-packed bearings are used, that when the packing is in running contact with the shaft, the shaft gradually wears down and becomes smaller in diameter at the area of contact because of the constant friction between the packing and the metal of the shaft. The rapidity of wear naturally depends upon the location in which the shaft is operating, that is to say, when machines are operated in very dusty places, gritty particles are picked up by the packing and are worked down into the bearing, thus producing an abrasive wear upon the shaft. When a new bearing is applied to a worn shaft, the bearing does not make full contact with the shaft, whereupon the bearing wears more or less to the shape of the worn shaft. Then, if such a worn bearing is applied to the shaft, the bearing frequently fails from overheating, and the material of the bearing, such as Babbitt metal, freezes to the worn surface of the shaft, thus preventing removal of the bearing without considerable trouble. In cases of that kind it is frequently necessary to heat the bearing sufficiently to soften the Babbitt metal so that it can be forced over and off the worn part of the shaft, thereby destroying its further usefulness.

Waste-packed bearings as ordinarily constructed, have the compacted waste always resting heavily upon a considerable portion of the journal area of the shaft. At the same time, the compacted packing closely contacts the walls of the reservoir cavity so that when a shaft is running it has the tendency to create a siphoning or pumping action through the packing, thereby drawing or sucking an excessive amount of oil into the bearing, which results in a corresponding wastefulness in the consumption of oil. Notwithstanding the excessive amount of oil used in waste-packed bearings as heretofore constructed, a shaft nevertheless is cut or scored because of its close contact with the packing.

By means of the novel device of the invention, the wear is enormously reduced, so that the life of the shaft and the life of the bearing are both correspondingly lengthened, while at the same time large quantities of oil are saved.

Briefly, the apparatus of the invention may include a waste-packed reservoir, the lower part of which is provided with a bottom whose under surface is spaced apart from the journal surface of the shaft so as to form a ceiling for a recess or cellar which is defined between the bottom and the coextensive journal area of the shaft. Communication between the absorbent reservoir and the cellar may be established, for example, by means of numerous perforations extending through the bottom, such perforations being relatively small in size in order to prevent fibers of the waste from working through the perforations and coming in contact with the shaft.

An advantageous arrangement of the invention comprises an easily separable cup or container that is removably inserted in a receiving cavity of the bearing structure. The aforementioned bottom may be integral with the wall structure of the cup. In this arrangement, the required waste or wick packing is tightly compressed within the cup, but as the cup fits loosely in the reservoir cavity, the packed cup can be easily lifted out for any purpose desired, such as cleaning or inspection of the bearing.

In using the novel bearing, the lubricant, which may be an oil of the proper viscosity, is poured onto the compacted waste in quantity greater than that required to saturate the waste. As the shaft runs, oil is gradually released from the waste in a restricted flow which finds its way through the perforations and spreads over the ceiling area, where the oil is slowly collected in numerous depending, semi-globular masses. As the oil accumulates in the semi-globular masses, it finally becomes detached from the ceiling to form droplets which are drawn by the rotating shaft onto the bearing surface proper, thus bathing this surface continually in a film of clean lubricant.

In the accompanying drawing which illustrates one embodiment of the invention,

Fig. 1 represents a plan, showing a roll bearing equipped with the invention;

Fig. 2, a vertical section taken on the line 2—2 in Fig. 1, and drawn to a scale considerably enlarged;

Fig. 3, a fragmentary elevation of the reservoir container or cup removed from the bearing and viewed in the direction of the arrow 3 in Fig. 2; and, Fig. 4, a further enlargement of a portion of Fig. 2, the location of this portion being indicated approximately by the broken line 4 in Fig. 2.

Referring to the drawing, the numeral 10 indicates a journal bearing supporting, rotatably, a shaft 14, and having an aperture in the bearing structure thereof, forming a reservoir cavity or chamber 12. In the preferred form of the invention, a separable cup or container 15, preferably made of metal, for example, sheet steel, is loosely disposed in the chamber 12, being supported in this instance, by means of a top flange 16, which may be integral with the container walls, and which may rest on the upper surface 10—1 of the bearing structure. Lugs 17, extending from the flange 16, may be provided for convenience in lifting the container out of, or replacing it in, the chamber 12. In the present embodiment, one container wall 15—1 is located somewhat to the left of the vertical center line 18 of the shaft 14, while the opposite container wall 15—2 has its lower portion 15—3 extending angularly inward in order that the bottom of the container shall lie within the limits of the upper circumferential area of the shaft. The wall portions of the container are advantageously bridged across from one to another by a strongly constructed bottom 19, the latter being provided with numerous perforations 20. The underneath surface or ceiling 19—1 of the bottom is spaced radially apart a limited distance from the circumferential surface of the shaft 14 so as to at least partially define an oil-distributing chamber or cellar 21 over which the surface 19—1 may be regarded as forming a drip ceiling. The drip ceiling is spaced apart from the circumferential surface of the shaft by a distance at least sufficient to allow the suspension of oil drops from the drip ceiling. The perforations 20 are so arranged, see particularly Fig. 3, as to break the continuity of flow of oil along the ceiling 19—1 and to form numerous oil droplets.

In using this lubricating device, the container 15 is preferably filled about one-half full of wool or cotton waste or other suitable absorbent material, as indicated at 24, this material being compacted to a density such that the filtration or seepage of oil through the compacted material onto the bottom takes place at approximately a desired prededetermined rate, for the purpose of regulating the amount of oil that finally reaches the bearing surfaces in a given unit of time.

Supposing that oil is poured into the space 25 and onto the surface of the absorbent packing 24, the latter immediately begins soaking up the oil, preferably to a degree of saturation. After a while, if the conditions of temperature, viscosity of the oil, and so on, are favorable, oil will commence draining from the saturated waste onto the bottom in a restricted or sluggish flow and will gradually creep through the perforations 20 and along the ceiling 19—1, as indicated approximately at 26 in Fig. 4. As the restricted flow of oil continues, it tends to become segregated in numerous semi-globular masses that depend from the ceiling 19—1, somewhat after the manner indicated at 27. The further enlargement of these semi-globular masses results finally in the detachment of droplets such as those indicated approximately at 28. The droplets fall onto the circumferential surface 14—1 of the shaft and coat the same with a film of oil, any excess collecting in a pool 29 that tends to be formed in the lower part of the cellar. A small quantity of the oil is discharged directly into the pool 29, as indicated approximately at 32.

The oil from the pool 29 funnels in between the bearing surface of the Babbitt lining 34 and the shaft surface 14—1, as indicated at 35, and insures complete filming of the journal with oil.

In order to keep dust and dirt out of the packing as far as practicable, a cover 36, hinged at 37 in accordance with usual construction, may be provided.

It will readily be seen at 30, Fig. 4, that the packing bridges the perforations 20 and that adequate lubrication is provided without the liability of having fibers from the reservoir packing come into frictional contact with the shaft.

In order to obtain the best operating conditions in the use of the invention, it is recommended that lubricating oil be provided which has a viscosity such as to permit little or no drainage of oil from the container at normal temperatures, that is to say, when the shaft is not rotating. The viscosity, however, should be such that soon after the shaft begins to rotate, the slight heat generated by such rotation is radiated to the ceiling 19—1, thereby promptly starting the flow of lubricant from the more or less congealed film 40 adhering thereto. As the shaft continues its rotation, the bearing becomes warmer and warmer, thereby releasing a greater and greater flow of the lubricant from the reservoir packing, and resulting in a tendency to keep the bearing cooled to a normal average operating temperature of a degree such that the flow of lubricant becomes substantially constant.

Since the container 15 fits loosely in the cavity 12, any tendency to create a pumping or siphoning effect through the reservoir packing because of the rotating shaft, is counteracted by atmospheric air that passes down into the cellar between the cavity walls and the outside of the container, as suggested by the spaces at 31.

Thus it is clear that by means of the invention, the amount of lubricant that is supplied to a bearing is predetermined by the amount that percolates through the compacted packing, practically under only the influence of the force of gravity.

It should be understood that the cellar or oil-distributing chamber 21 is intended to function as a space in which the oil, normally stored in the absorbent packing reservoir, is freely and efficiently applied, rather than itself functioning as a storage space. To this end it is desirable that the area of the cellar or oil-distributing chamber be substantially coextensive with the area of the bottom of the packing container or drip ceiling, and that there be substantially no intervening structure between it and the adjacent portion of the circumferential surface of the shaft.

In general, the construction of the bottom may be considerably varied, the main purpose being to provide free communication for the passage of oil from the packing storage to the application cellar, and at the same time to give the bottom the necessary strength to resist springing or other distortion which might cause it to be deflected towards the surface of the shaft.

As an example of an oiler of the invention in satisfactory actual service with a bearing and shaft 10 inches in diameter, it may be stated that the bottom consists of a perforated brass plate about one-quarter inch thick assembled with steel plates, such as 15—1 to 15—4, all welded together into a unitary, integral structure. In this instance, the distance between the shaft and the ceiling, forming the cellar recess, is approximately one-quarter inch. The dimensions and materials just mentioned are suggestive but not necessarily restrictive.

In the bearing illustrated, it is preferred to have the shaft turn in the direction of the arrow 38, although this is not absolutely necessary for successful operation.

With the apparatus of the invention as hereinbefore described, is involved a novel method of oiling in which the oil, in the form of an overhanging or suspended transitory film 40 of considerable area, adheres to the ceiling surface 19—1 in spaced relation to a corresponding and substantially coextensive circumferential shaft area. This overhanging oil film is spread over the ceiling surface between the perforations 20, and is fed by the oil that oozes from the absorbent reservoir 24 through the perforations. The oil film 40, in turn, feeds the semi-globular oil masses 27 as well as the pool or sump 29. As before stated herein, the warmth resulting from the rotating shaft releases the oil that may be congealed in the film, and keeps up the flow and distribution of the oil over substantially the entire ceiling surface under normal running conditions.

The method here disclosed forms the subject matter of divisional application Serial No. 632,409, filed December 3, 1945, and entitled "Method of oiling."

Obviously, numerous minor changes can be made in the embodiment of the invention as herein shown and described, without departing from the terms of the following claims.

What I claim is:

1. A portable lubricating cup, comprising imperforate lateral walls, and a perforate bottom wall, all secured together, the perforations of said bottom wall being relatively small and scattered throughout substantially the entire area of said bottom wall in mutually closely spaced relationship; and oil-absorbent material covering the said bottom wall and partially filling the interior of the cup, the bottom surface of said perforate wall being free and uncovered over substantially its entire area.

2. A lubricating device for a journal bearing, comprising a lubricating cavity extending downwardly and opening into an upper portion of the journal, providing an open area above the shaft to be oiled; a portable lubricating cup loosely fitted into said cavity; said lubricating cup having imperforate lateral walls and a perforate bottom wall, all secured together, the perforations of said bottom wall being relatively small and scattered substantially throughout the area of said bottom wall in mutually closely spaced relationship, the said bottom wall substantially following the curvature of that circumferential surface area of the journal over which it lies, and the under-surface thereof forming a ceiling; means supporting said lubricating cup within said cavity so that the said perforate bottom wall is substantially entirely spaced apart from the circumferential surface of the journal by a distance at least sufficient to allow the formation of oil drops on the under surface thereof, whereby an oil-distribution chamber is provided between the said bottom wall and a substantially corresponding area of the circumferential surface of the journal; oil-absorbent material covering the said perforate bottom wall and partially filling the interior of the said lubricating cup; and oil disposed in said lubricating cavity in quantity greater than that required to saturate said oil-absorbent material.

3. A lubricating device according to claim 2, wherein passage means for atmospheric air is provided between the lubricating cup and the walls of the lubricating cavity, leading from the exterior of the journal bearing to the oil-distribution chamber.

4. In a journal bearing, a lubricating device comprising an aperture extending through the bearing structure and opening onto the journal; ceiling structure disposed within and transversely of said aperture and substantially corresponding in area with the transverse area of said aperture, the under-surface thereof forming a ceiling, said ceiling structure being spaced apart from the said journal by a limited distance at least sufficient to allow the formation of oil drops on said ceiling; a multitude of small drip means scattered throughout the area of said ceiling in mutually closely spaced relationship so as to break the continuity of surface flow of oil thereover; and means for supplying oil to said ceiling substantially in accordance with the lubricating requirements of said journal.

5. In a journal bearing, a lubricating device comprising an aperture extending through the bearing structure and opening onto the journal; ceiling structure disposed within and transversely of said aperture and substantially corresponding in area with the transverse area of said aperture, the under-surface thereof forming a ceiling, said ceiling structure being spaced apart from the said journal by a limited distance at least sufficient to allow the formation of oil drops on said ceiling; a multitude of small drip openings extending through said ceiling structure and scattered throughout the ceiling area thereof in mutually closely spaced relationship so as to break the continuity of surface flow thereover; oil-absorbent material disposed within said aperture and resting upon the upper surface of said ceiling structure; and oil disposed in said aperture in quantity greater than that required to saturate said oil-absorbent material.

6. A portable lubricating cup as recited in claim 1, wherein the bottom wall is formed of a copper-containing alloy, and the side walls are formed of ferrous metal.

7. A lubricating device as recited in claim 2, wherein the bottom wall of the lubricating cup is formed of a copper-containing alloy, and the side walls thereof are formed of ferrous metal.

8. A shaft oiler, including in combination, a drip ceiling disposed above and extending over a substantially corresponding area of the circumferential surface of a shaft and spaced apart therefrom by a distance at least sufficient to allow the suspension of oil drops from the drip ceiling, the entire space between the drip ceiling and the corresponding circumferential shaft area being substantially clear and unobstructed; a multitude of relatively small oil-droplet-forming means scattered along the area of the said drip ceiling; and means for slowly feeding oil to the said oil-droplet-forming means.

CARL W. MADSEN.